US009718690B2

(12) United States Patent
Neumann et al.

(10) Patent No.: US 9,718,690 B2
(45) Date of Patent: Aug. 1, 2017

(54) METHOD FOR PRODUCING A POROUS CARBON PRODUCT

(71) Applicant: Heraeus Quarzglas GmbH & Co. KG, Hanau (DE)

(72) Inventors: Christian Neumann, Hungen (DE); Matthias Otter, Münster (DE); Jörg Becker, Niddatal (DE); Sascha Pihan, Aschaffenburg (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 15/022,340

(22) PCT Filed: Sep. 19, 2014

(86) PCT No.: PCT/EP2014/070044
§ 371 (c)(1),
(2) Date: Mar. 16, 2016

(87) PCT Pub. No.: WO2015/040186
PCT Pub. Date: Mar. 26, 2015

(65) Prior Publication Data
US 2016/0289077 A1  Oct. 6, 2016

(30) Foreign Application Priority Data
Sep. 20, 2013 (DE) ........................ 10 2013 110 453

(51) Int. Cl.
| | |
|---|---|
| *C01B 31/02* | (2006.01) |
| *C04B 35/52* | (2006.01) |
| *C04B 35/63* | (2006.01) |
| *C04B 35/638* | (2006.01) |
| *C04B 38/00* | (2006.01) |
| *C04B 38/04* | (2006.01) |
| *B01J 20/30* | (2006.01) |
| *C04B 111/00* | (2006.01) |

(52) U.S. Cl.
CPC ........... *C01B 31/02* (2013.01); *B01J 20/3057* (2013.01); *B01J 20/3078* (2013.01); *C04B 35/52* (2013.01); *C04B 35/6303* (2013.01); *C04B 35/638* (2013.01); *C04B 38/0022* (2013.01); *C04B 38/04* (2013.01); *C04B 2111/0081* (2013.01); *C04B 2111/00793* (2013.01); *C04B 2111/00836* (2013.01); *C04B 2111/00853* (2013.01)

(58) Field of Classification Search
CPC ...................................................... C01B 31/02
See application file for complete search history.

(56) References Cited

U.S. PATENT DOCUMENTS

| | | |
|---|---|---|
| 4,263,268 A | 4/1981 | Knox et al. |
| 2003/0129120 A1 | 7/2003 | Klett |
| 2005/0169829 A1 | 8/2005 | Dai et al. |
| 2014/0107371 A1 | 4/2014 | Bakker et al. |

FOREIGN PATENT DOCUMENTS

| | | |
|---|---|---|
| DE | 2946688 A1 | 6/1980 |
| DE | 69934256 T2 | 6/2007 |
| WO | 2012119666 A1 | 9/2012 |

OTHER PUBLICATIONS

International Preliminary Report issued Mar. 31, 2016 in International Application No. PCT/EP2014/070044.
International Search Report issued Mar. 5, 2015 in International Application No. PCT/EP2014/070044.
Search Report issued May 22, 2014 in DE Application No. 102013110453.3.
Lu et al., "Nanocasting: A Versatile Strategy for Creating Nanostructured Porous Materials," Advanced Materials, vol. 18, pp. 1793-1805 (2006).

*Primary Examiner* — Stuart Hendrickson
(74) *Attorney, Agent, or Firm* — Panitch Schwarze Belisario & Nadel LLP

(57) ABSTRACT

Methods for producing porous carbon product utilize template material in the form of template particles containing macropores and a polymerizable carbon precursor substance. The macropores of the template are infiltrated with the precursor substance in dissolved or melted form. After carbonization of the infiltrated precursor substance, the template is removed to form the porous carbon product. In order to obtain a carbon structure with hierarchical porosity having a high fraction of mesopores having pore sizes in the range of 2 to 50 nm, after the infiltration and before carbonization, the precursor substance within the macropores of the template is subjected to a treatment at a foaming temperature at which the precursor substance foams under polycondensation and fills the macropores as substantially mesoporous foam, in which at least 70% of the pores have pore sizes in the range of 10 to 150 nm.

8 Claims, 2 Drawing Sheets

METHOD FOR PRODUCING A POROUS CARBON PRODUCT

CROSS-REFERENCE TO RELATED APPLICATIONS

This application is a Section 371 of International Application No. PCT/EP2014/070044, filed Sep. 19, 2014, which was published in the German language on Mar. 26, 2015 under International Publication No. WO 2015/040186 A1 and the disclosure of which is incorporated herein by reference.

BACKGROUND OF THE INVENTION

Porous carbon is used, for example, in electrodes for fuel cells, supercapacitors, electric accumulators (secondary batteries) and as adsorbents for liquids and gases, as a storage medium for gases, as a carrier material in chromatographic applications or catalytic processes, and as a material in mechanical engineering or medical technology.

Components of porous carbon foam have been known for a long time. This foam is obtained by heating organic starting materials to temperatures between 1000-1500° C. under inert gas. DE 69934256 T2, for instance, describes a method for producing open-pored, substantially graphitic, carbon foam by heating and coking pitch under non-oxidizing conditions under pressure.

Carbon foam is distinguished by an extremely low density of less than 0.1 g/cm$^3$ and by a high temperature resistance of up to 4000° C. under inert gas. Typical minimal pore sizes are around 5 µm; for many applications, however, pores are needed in the nanometer range, as well as large specific surface areas that cannot be obtained with this material.

DE 29 46 688 A1 discloses methods for preparing porous carbon using a temporary preform of porous material (a so-called "template"). A precursor substance for carbon is deposited in the pores of the "template" consisting of inorganic template material which has a surface area of at least 1 m$^2$/g. SiO$_2$ gel, porous glass, aluminum oxide or other porous heat-resistant oxides are mentioned as suitable template materials for the template. The template material has a porosity of at least 40% and a mean pore size in the range of 3 nm to 2 µm.

Polymerizable organic materials, such as a mixture of phenol and hexamine or a phenol-formaldehyde resol, are recommended as the precursor substance for carbon. It is introduced as a liquid or as a gas into the pores of the template and polymerized. After polymerization and subsequent carbonization, the inorganic template material of the template is removed, e.g. by dissolution in NaOH or in hydrofluoric acid.

In this way, a particle- or flake-like carbon product is obtained which has a pore structure with macropores substantially reflecting the former template structure. This carbon structure can also contain micropores, which can be reduced or eliminated by a post-treatment such as coating with a pyrocarbon or by graphitization. The carbon product is suited for use in gas chromatography or as a catalyst carrier.

A so-called "hierarchical pore structure," however, turns out to be advantageous for many applications. Large surfaces can be provided by pores in the nanometer range. To enhance the accessibility to said pores, these are ideally connected via a continuous macroporous transport system. A monolithic carbon product with such a hierarchical pore structure of macropores and mesopores is described in US 2005/0169829 A1. To prepare the hierarchical pore structure, a SiO$_2$ template is produced by heating a dispersion of silica beads with diameters of 800 nm to 10 µm and of a polymerizable substance in a mold, so that a porous silica gel is obtained by polymerization, the gel being dried after removal of the excess liquid and completely polymerized.

The pores of the SiO$_2$ template obtained thereby are subsequently impregnated with a precursor substance for carbon, which carbonizes the carbon precursor substance into carbon, and subsequently removes the SiO$_2$ template by dissolution in HF or NaOH. The carbon product obtained thereby also shows a pore structure approximately corresponding to the material distribution of the template. Phenolic synthetic resin which is dissolved in tetrahydrofuran (THF) is here used as the precursor substance for carbon.

The common graphitizable carbon precursor substances for the infiltration are not soluble in high concentration and have a fraction of insoluble constituents. For instance, the solubility of pitches in THF is less than 10% by vol., so that after evaporation of the solvent more than 90% of the originally filled pore volume remains unfilled. The volume of the remaining coating of carbon precursor is further reduced by subsequent carbonization.

Conversely, carbon precursors in the form of carbohydrates—such as sugars—exhibit high solubility in solvents, but the sugar remaining after evaporation of the solvent loses up to 75% of its original mass in the carbonizing process, so that a large pore volume also remains unfilled in this instance. Therefore, these carbon precursors will normally yield only small thicknesses of the deposited carbon layer. In order to achieve technically reasonable wall thicknesses of the porous carbon structure, several of these infiltration and carbonization processes have to be carried out one after the other as a rule. These multiple processes, however, increase the manufacturing costs and can cause inhomogeneities, for instance as a result of the gradual clogging of infiltration channels.

To mitigate this problem, WO 201211966 A1 suggests a modification of the production of porous carbon using porous template material with a hierarchical pore structure. Powders produced in advance, both from the porous template material and from the precursor substance, are provided. These powders are mixed together homogeneously and the homogeneous powder mixture is heated to such an extent that the particles of the precursor substance melt; the precursor substance melt can penetrate into the pores of the template. A solvent for the carbon precursor substance may also be omitted. A uniform distribution and occupation over the entire pore volume of the template material to be infiltrated is attained, so that even with only a one-time infiltration one already achieves a high filling degree of the pore volume.

The carbonization of the precursor is carried out at the same time as or subsequent to the infiltration of the pores of the template particles. The concurrent shrinkage of the precursor substance is due to the decomposition and evaporation processes during carbonization. The inorganic template material serves only as a mechanically and thermally stable framework for depositing and carbonizing the carbon precursor substance.

After removal, for instance by chemical dissolution, the resulting carbon product is substantially free of template material. It shows a finely rugged surface which is crisscrossed in the form of channels by a multitude of coherent pores and voids of different sizes.

The technical article "Nanocasting—A Versatile Strategy for Creating Nanostructured Porous Materials" by An-Hui Lu, Ferdi Schüth, published in *Adv. Mater.* (18), 1793-1805 (2006), describes a template method in which mesoporous $SiO_2$ is infiltrated with a precursor substance for carbon and carbonized, and the $SiO_2$ framework is dissolved. This yields mesoporous carbon.

BRIEF SUMMARY OF THE INVENTION

The present invention refers to a method for producing a porous carbon product, comprising the following method steps:
(a) providing a template material in a form of template particles containing macropores,
(b) providing a carbon precursor substance,
(c) infiltrating the macropores of the template with the precursor substance in melted or dissolved form at a temperature Ta,
(d) carbonizing the precursor substance at a temperature Tc, and
(e) removing the template to form the porous carbon product.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
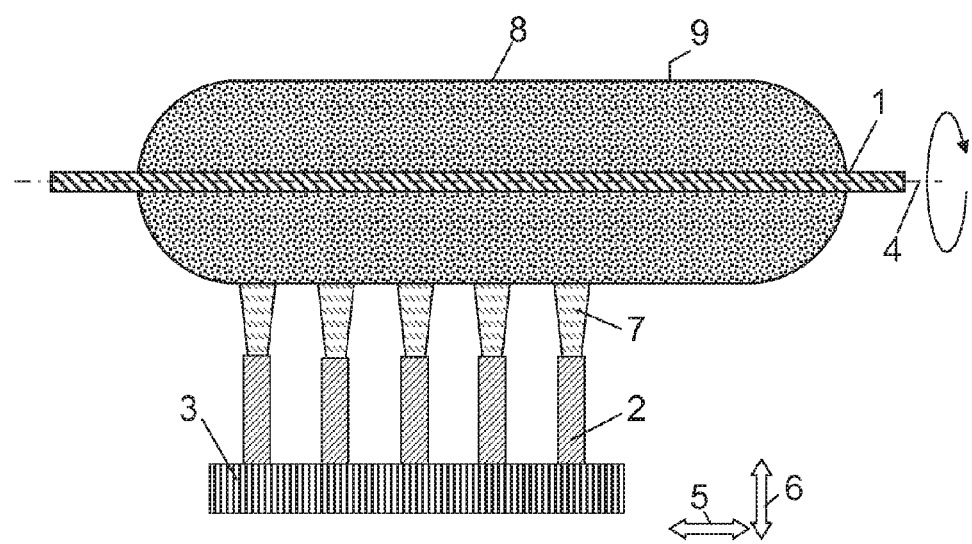
FIG. 1 is a diagram of an apparatus for producing a $SiO_2$ soot body according to an embodiment of the invention.

It is the object of the present invention to provide a method which provides for an inexpensive preparation of a carbon structure having a hierarchical porosity with a high proportion of mesopores with pore sizes in the range of 2-50 nm.

The method for producing a porous carbon product, comprising the following method steps:
(f) providing a template material in the form of template particles containing macropores,
(g) providing a carbon precursor substance,
(h) infiltrating the macropores of the template with the precursor substance in melted or dissolved form at a temperature Ta,
(i) carbonizing the precursor substance at a temperature Tc, and
(j) removing the template to form the porous carbon product.

The object is achieved according to the invention in that that after infiltration according to method step (c) and prior to carbonization according to method step (d) the precursor substance is subjected within the macropores of the template to a treatment at a foam formation temperature Tb at which the precursor substance foams under polycondensation and fills the macropores as a fine-pored foam which, after carbonization, forms a porous foam-like carbon structure in which at least 70% of the pores have pore sizes in the range of 10 nm to 150 nm.

As in the known methods, the carbon precursor substance, such as sucrose, is brought into contact with the template at a comparatively low temperature Ta as a melt or in dissolved form so that it can penetrate into the pores thereof and fill them, at least in part. The carbon precursor substance forms a layer-like deposit on the walls of the infiltrated pores.

In known methods, the deposit is then converted by carbonizing into graphitic, graphite-like or turbostratic carbon. Carbonization is carried out by heating the deposit to a comparatively high temperature Tc, typically more than 400° C.

By contrast, in the method according to the invention, carbonization is preceded by a separate treatment of the deposited layer at a lower temperature Tb. This treatment causes, if possible, a complete and uniform foaming of the deposited layer material prior to carbonization, and therefore requires a certain holding period. Due to foam formation, the volume of the deposits is increased, so that the pores are at least partially and ideally completely filled with foam. This effect is also known in other foam materials—for example, in polyurethane foam used in the construction sector. The foam formation is based on the separation of functional groups in the polymerization of the precursor substance, which groups form gaseous components at Tb, for instance water or carbon dioxide. To enable the released gas to form bubbles in the precursor substance, the precursor substance at the temperature Tb must still be plastically deformable.

This polycondensation reaction can be thermally activated, wherein the start temperature is also dependent on ambient parameters such as pressure and atmosphere and can be catalytically promoted or inhibited by foreign substances. The reaction itself typically takes place within a temperature range. A specific temperature can therefore not be attributed to the treatment temperature Tb, but it is within a temperature range within which the respective polycondensation reaction takes place.

As a rule, however, Ta<Tb<Tc is valid. If the precursor substance exhibits a discrete melting temperature Ta, this temperature is normally below Tb. Frequently, however, a melting range that might overlap with the melting range for Tb must be assigned to the precursor substance.

Hence, the deposited precursor substance is treated at a temperature Tb which is characterized in that gas is released from the precursor substance and the precursor substance is still plastically deformable at the same time.

The evolving foam has fine bubbles in the sense that it substantially contains bubbles in the mesopore range (at least 70% of the bubbles) with bubble diameters of up to about 150 nm. In the fine-pored carbon structure obtained from the foam with fine bubbles by carbonization, at least 70% of the pores have pore sizes in the range of 10 nm to 150 nm. Possible micropores with pore sizes of less than 2 nm are not taken into account. Since the pores are predominantly in the size range of mesopores (by definition, mesopores have pore sizes between 2 nm and 50 nm), this porous mass shall also be called "mesoporous carbon foam" hereinafter. To obtain this fine-pored foam-like pore structure, a limitation of the bubble growth is required during foam formation. This limitation is based on two measures.

On the one hand, the bubble growth is already limited by the size of the macropores of the template material and by the amount of the precursor substance introduced into the pores. The mean pore size of the macropores is therefore as small as possible and is typically about 400 nm to about 1000 nm. On the other hand, the bubble formation across the volume of the deposits of precursor substance ideally takes place in a uniform manner, which is promoted by spatial temperature differences that are as small as possible. A small temperature gradient is achieved by holding times and flat temperature ramps in the temperature range around Tb.

In this respect, it has turned out to be advantageous if the foam formation temperature Tb has a temperature range of not more than 100° C., preferably not more than 50° C., and that the treatment duration is at least 10 min, preferably at least 30 min, at the foam formation temperature Tb.

Preferably, the precursor substance is selected such that during foam formation, it separates at least 30%, particularly preferably at least 50%, of its initial mass as gas prior to the polycondensation reaction.

The larger the gas volume released, the higher the porosity of the precursor substance after carbonization.

As a rule, fusible organic carbon compounds with a certain amount of releasable condensate are suitable as the precursor substance of the high-porosity carbon. This includes pitches if they can be decomposed by polycondensation, for instance petroleum pitch.

Preferably, however, carbohydrate is used as the carbon precursor substance.

Carbohydrates, especially sugars such as sucrose, fructose or glucose, are fusible and have a high water content, which is produced as a reaction product during polymerization and contributes to the formation of bubbles. They represent non-graphitic carbon precursor substances which are distinguished by a high specific surface area after carbonization.

It has turned out to be useful to utilize template particles of a non-spherical morphology that are formed as platelets or small rods with a structural ratio of at least 5, preferably of at least 10, and have a mean thickness in the range of 5 µm to 100 µm, particularly preferably less than 50 µm.

"Structural ratio" means the ratio of the greatest structural width of the particle to its thickness. A structural ratio of at least 5 therefore means that the largest structural width of a particle is at least 5 times greater than its thickness. Such particles have essentially the shape of platelets or small rods and are distinguished by two large surfaces extending substantially in parallel, through which the infiltration of the fusible precursor substance can take place relatively quickly because the thickness of the volume to be filled is relatively low, preferably less than 100 µm, and more preferably between 10 µm and 50 µm.

Template particles with a thickness of less than 10 µm have a low mechanical strength and hinder the formation of a strong hierarchical pore structure. With thicknesses of more than 100 µm, it becomes increasingly difficult to ensure a homogenous infiltration with the fusible precursor sub stance.

In an advantageous procedure, the precursor substance is provided in the form of precursor substance particles of a material having a melting temperature below Ta, and the precursor substance particles are mixed with the template particles in a mass ratio in the range between 0.05 and 1.6, preferably in a mass ratio in the range between 0.1 and 0.8.

Here, precursor substance particles—preferably in the form of pitches—and template particles are mixed in advance and the particle mixture is heated so that the precursor melts and can penetrate in a molten phase into the pores of the template. Through the mixing ratio of precursor substance and template material, the filling degree of the pores is set. At a mixing ratio of 0.05, the inner surfaces of the template are covered with only one layer of a small thickness, which just results in a sponge-like web of carbon. Even smaller mixing ratios are therefore not preferred. By contrast, at a mixing ratio of 1.6 one obtains a substantially filled pore structure, depending on the initial pore volume of the template material.

Hard templates of oxidic, nitridic, carbidic materials are suitable as template materials, but templates of other substances such as plastics are also possible. Preferably, the template material is $SiO_2$.

Synthetic $SiO_2$ may be produced at relatively low cost on an industrial scale by soot deposition processes using inexpensive starting substances. The $SiO_2$ template withstands high temperatures during carbonization and is chemically inert at least up to 1000° C. The upper temperature limit is determined by the onset of the reaction of $SiO_2$ with carbon to form SiC (at about 1000° C.). The removal of the template in the form of synthetic $SiO_2$ according to method step (e) is carried out by chemical dissolution.

The finer the template particles, the faster, more efficient and more uniform is the infiltration under otherwise identical process conditions. The template particles are produced, for example, by milling porous bodies of the template material or by breaking layers of the template material, by pressing a powder of the template material, or by sol-gel methods or granulation methods. A narrow, ideally monodisperse particle size distribution is advantageous for the method according to the invention, which is achieved, for example, by sieving.

It has turned out to be particularly advantageous when providing the template particles involves a soot deposition process in which a feedstock is converted by hydrolysis or pyrolysis into template material particles which are deposited onto a deposition surface to form a soot body from the template material, and that the soot body is comminuted into the template particles.

In this variant of the method according to the invention, the production of the template includes a soot deposition process. Here, a liquid or gaseous starting substance is subjected to a chemical reaction (hydrolysis or pyrolysis) and deposited from the gas phase as a solid component onto a deposition surface. The reaction zone is, for example, a burner flame or an electric arc (plasma). By utilizing such plasma or CVD soot deposition methods which are known, for example, under the names OVD or VAD methods, synthetic quartz glass, tin oxide, titanium oxide, titanium nitride, and other synthetic materials are produced on an industrial scale.

It is essential for the suitability of the deposited template material for the production of a template that the template material is obtained on the deposition area, which may be, for example, a vessel, a mandrel, a plate, or a filter, as porous "soot." This is ensured by keeping the temperature of the deposition surface so low that a dense sintering of the deposited template material is prevented. A thermally consolidated, but porous "soot body" is obtained as an intermediate product.

The soot deposition method is an inexpensive method compared to a production method using the "sol-gel route," which permits an inexpensive production of templates on an industrial scale.

In the soot bodies thus obtained, it has proven to be particularly favorable if these have an anisotropic mass distribution with hierarchical pore structure due to the manufacturing process. The reason is that in the reaction zone, the gas phase deposition creates primary particles of the template material with particle sizes in the nanometer range. These primary particles agglomerate on their way to the deposition surface and are obtained in the form of more or less spherical agglomerates or aggregates on the deposition surface, which are also referred to as "secondary particles" hereinafter. Within the primary particles and within the secondary particles, i.e., between the primary particles, especially small voids and pores are present in the nanometer range, i.e. so-called mesopores, whereas larger voids or pores form between the individual secondary particles.

The template particles obtained by crushing or milling also show the hierarchical structure given in the template material, with oligomodal pore size distribution.

In the soot deposition process, the template material may also be present in the form of soot powder which is subsequently further processed by granulation, press, slurry or sinter methods into the template particles. Granulates or flakes should here be mentioned as intermediate products.

The layer of the template material produced by soot deposition can be comminuted with little effort, resulting in template particles with plate-like or flake-like morphology.

Such template particles, which are distinguished by a non-spherical morphology, are particularly advantageous for use in the method according to the invention.

The reason is that particles with a spherical morphology, i.e., particles having a spherical shape or nearly spherical morphology, have a small surface in relation to their volume. By contrast, particles with non-spherical morphology have a greater ratio of surface to volume, which simplifies and equalizes the infiltration with the precursor substance.

Preparing Template Material with Hierarchical Pore Structure

The apparatus shown in FIG. 1 may be used for the preparation of a $SiO_2$ soot body. A plurality of serially arranged flame hydrolysis burners 2 are arranged along a support tube 1 of aluminum oxide. The flame hydrolysis burners 2 are mounted on a common burner block 3 which is reciprocated in parallel with the longitudinal axis 4 of the support tube 1 between two turning points that are stationary with respect to the longitudinal axis 4, and which is moveable in a direction perpendicular thereto, as outlined by the directional arrows 5 and 6. The burners 2 consist of quartz glass; their mutual distance is 15 cm.

The flame hydrolysis burners 2 each have assigned thereto a burner flame 7, the main propagation direction of which is perpendicular to the longitudinal axis 4 of the support tube 1. With the help of the flame hydrolysis burners 2, $SiO_2$ particles are deposited on the outer cylinder surface of the support tube 1 rotating about its longitudinal axis 4, so that the porous $SiO_2$ blank 8 is built up layer by layer with an outer diameter of 400 mm. The individual $SiO_2$ soot layers have an average thickness of about 50 µm.

The flame hydrolysis burners 2 are each fed with oxygen and hydrogen as burner gases and with $SiCl_4$ as feedstock for the formation of the $SiO_2$ particles. The burner block 3 is here reciprocated with an amplitude of two burner distances (i.e., 30 cm). During the deposition process a mean temperature of about 1200° C. is set on the blank surface 9.

After completion of the deposition process a tube of porous $SiO_2$ soot (soot tube) is obtained with a length of 3 m, an outer diameter of 400 mm and an inner diameter of 50 mm. The temperature during the build-up of the soot body is kept comparatively low, so that the $SiO_2$ material has a low mean relative density of 22% (based on the density of quartz glass 2.21 $g/cm^3$).

Due to the low density the porous soot material can be comminuted easily. On account of the layered buildup of the soot body, layers that are placed one on top of the other tend to ablate in the case of high mechanical forces, resulting in platelet- or flake-like soot particles with a thickness in the range of 20 µm and 50 µm during grinding. These soot particles are used in the further production process as template material particles.

Due to the manufacturing process the soot particles show an anisoptropic mass distribution with hierarchical pore structure. This is due to the fact that during gas phase deposition, $SiO_2$ primary particles with particle sizes in the nanometer range are formed in the reaction zone, which primary particles on their way to the deposition surface agglomerate and are obtained in the form of more or less spherical agglomerates or aggregates on the deposition surface. These "secondary particles" consist of a different number of primary particles and therefore show a wide particle size distribution as a rule. Within the secondary particles—between the primary particles—there are particularly small voids and pores in the nanometer range, i.e., so-called mesopores, whereas macropores with typical clear widths of about 400 nm to 1,000 nm are formed between the individual secondary particles.

Preparation of a Dry Mixture Consisting of Particles of the Template Material and of a Carbon Precursor Substance Capable of Foam Formation A fine-grained cane-sugar powder fraction which consists substantially of spherical particles with particle sizes between 5 µm and 20 µm is obtained by grinding cane sugar and by sieving. The cane-sugar and the soot particles are homogeneously mixed with one another in the weight ratio 25:75.

Fusion of the Particle Mixture and Infiltration

The particle mixture is heated to a temperature of about 160° C. (corresponds to the temperature Ta). At this temperature, cane sugar is viscous and starts to decompose. At the same time, the viscous cane-sugar melt encases the small $SiO_2$ soot particles and penetrates into the pores. The ratio of cane-sugar and soot-particle mass is chosen such that the cane-sugar melt fills the pores, so that no significant free pore volume will remain and will be consumed almost completely. After an infiltration period of about 30 min, the infiltration of the pores is substantially completed. The pores of the soot particles are now substantially filled with a molten cane-sugar layer.

Foam Formation Process

Subsequently, the temperature is slowly raised to about 205° C. (corresponds to the temperature Tb) and maintained for about 60 min. At this temperature, cane sugar is subjected under dehydrating conditions to a fast polycondensation reaction with separation of water. Until the complete conversion into carbon, the remaining cane-sugar melt is still largely plastically deformable. As a result, the evaporated water released in the polycondensation reaction can lead to the formation of bubbles, which manifests itself as foam formation of the cane sugar.

Under uncontrolled conditions, this bubble formation may lead to an inhomogeneous bubble formation with large bubbles within the macroporosity of the template particles, which are however not desired for the invention. Large bubbles are avoided by the described gentle treatment of the cane sugar at the temperature Tb, because first bubble nuclei which experience a comparatively small bubble growth and the growth of which is moreover restricted by the pore size of the template material are thereby simultaneously formed at many places. Under these boundary conditions, a foam formation is achieved where the bubbles have substantially sizes of about 10 nm to 150 nm (at least 70% of the bubbles) and thereby fill the macropores of the template material due to a comparatively great bubble volume at least partially and ideally completely with foam.

Carbonization

After completion of the foam formation process, the treatment temperature is raised to about 650° C. (corresponds to the temperature Tc) and the previously foamed cane sugar is carbonized in a nitrogen atmosphere to porous, turbostratic carbon. In this method step at the latest, the foam-like mesoporous bubble structure is open-pored because formerly entrapped gases escape.

After complete carbonization, one obtains a composite mass of porous $SiO_2$ soot particles which are covered on the outside and inside (i.e., within their pores) with a layer of a carbon foam that is also porous. The porosity of the carbon foam is predominantly created by pores with pore sizes in the range of 10 nm to 150 nm (at least 70% of the pores).

Figure 2:
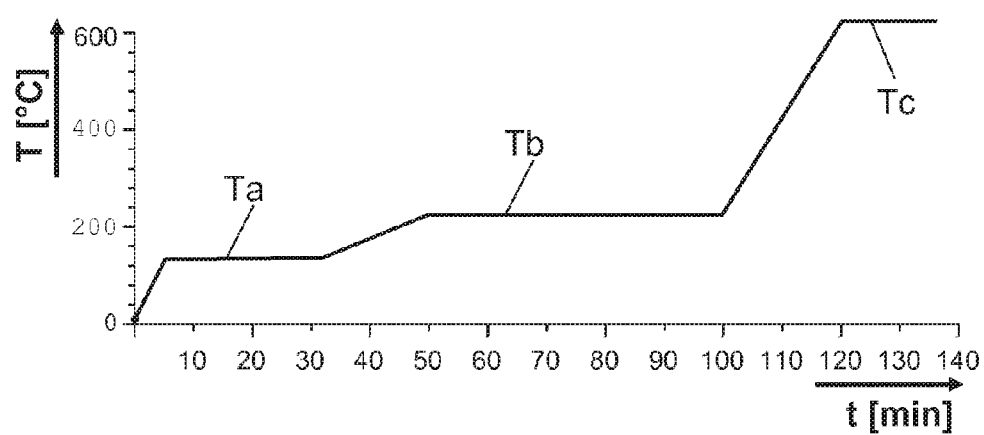
FIG. 2 is a heating profile for melting the precursor substance, for foam formation and for carbonization.

FIG. 2 shows the heating profile (temperature T in ° C. plotted over time t in minutes) of the above-explained thermal treatment steps. The altogether slow process of heating the molten cane-sugar phase to the foam formation temperature Tb is especially important for a uniform and homogeneous foam formation within the volume given by the macropores of the template material.

Removal of the Template Material

The $SiO_2$ soot material is subsequently removed by introducing the composite mass into a hydrofluoric acid bath. After the etching away of the $SiO_2$ particles, the material is washed, dried and comminuted, with the material disintegrating into flakes of porous carbon having a structure which is substantially a negative image of the original $SiO_2$ soot particles. The network-like volume previously occupied by $SiO_2$ now forms an additional, channel-like macropore space around the substantially mesoporous carbon foam. The resulting carbon product is therefore distinguished by a hierarchical pore structure in which a multitude of interconnected pore channels (macropores) extend through an otherwise fine-pored mass (predominantly mesopores).

Figure 3:
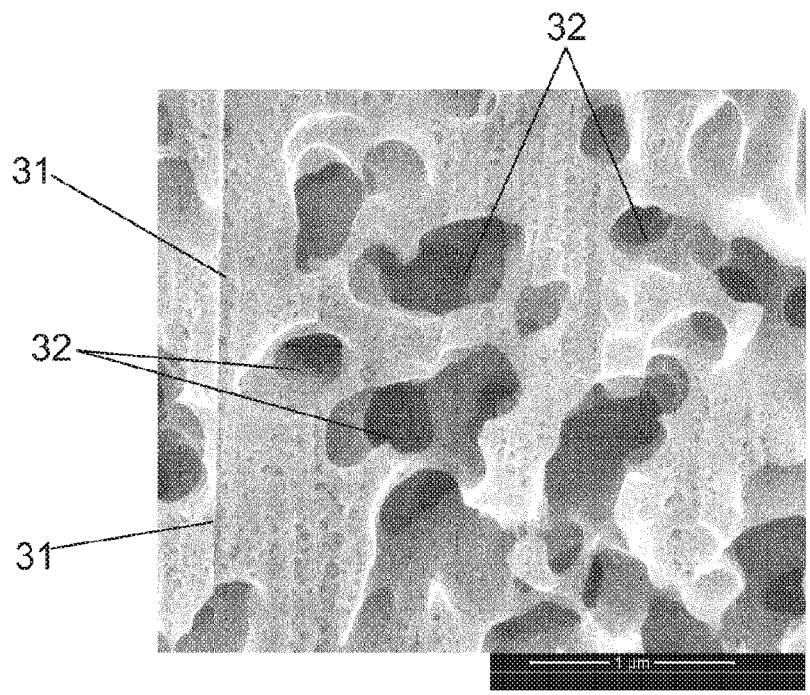
FIG. 3 is an SEM image of an embodiment of the porous carbon product obtained according to the method of the invention with a hierarchical pore structure.

The SEM image in FIG. 3 shows the resulting carbon structure with a multitude of coherent pores and voids of different sizes. In the sponge-like mass 31 which is crisscrossed by fine pores, almost 100% of the pores have pore sizes in the range of 10 nm to 150 nm. This sponge-like or foam-like mass 31 is surrounded by rather large voids 32 and crisscrossed by these voids in the form of channels. A measurement of the specific internal surface area of the carbon structure according to the BET method yields measurement values of about 450 $m^2/g$.

The "specific (BET) surface area" is determined according to the method of Brunauer, Emmet and Teller (BET) on the basis of DIN 66132 and is based on gas absorption on the surface to be measured.

Figure 4:
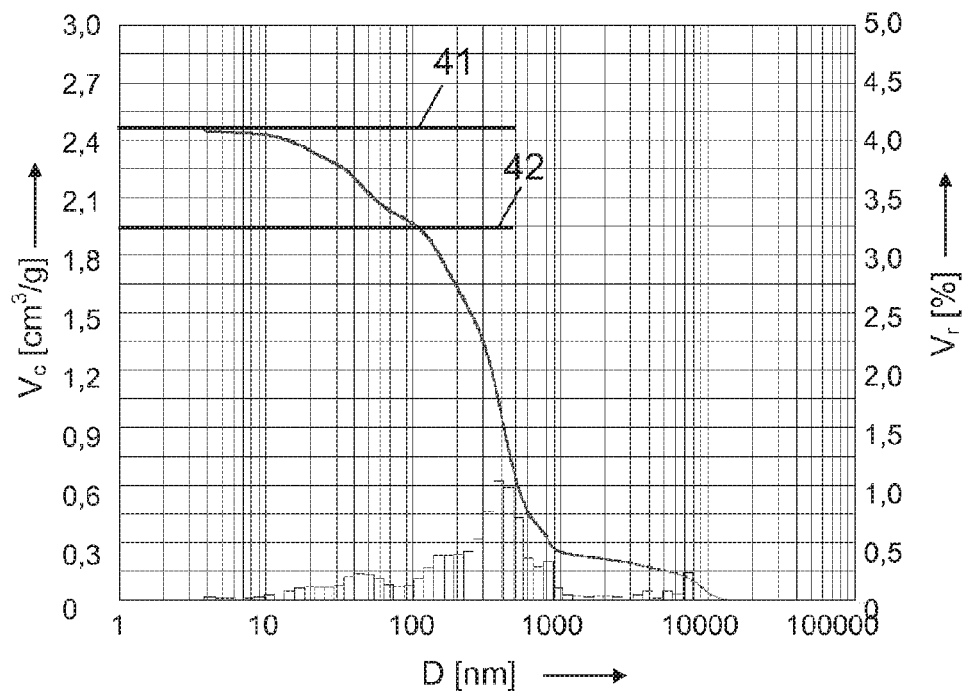
FIG. 4 is a diagram of the pore size distribution of the porous carbon product according to the invention.

FIG. 4 shows the pore size distribution of the carbon product. On the left ordinate, the cumulative pore volume $V_c$ is plotted in [$cm^3/g$] and on the right ordinate the relative pore volume V, is plotted in [%] against the pore diameter D in [nm]. It is perceivable that a first maximum of the pore size distribution in the mesopore range is about 50 nm and that pores with pore sizes of up to 100 nm (line 42) account for about 0.53 $cm^3/g$ (difference of the cumulative pore volume between the lines 41 and 42), which corresponds to a proportion in the total pore volume (about 2.45 $cm^3/g$) of about 20%. This pore volume must mainly be ascribed to the "mesoporous carbon foam." The second maximum of the pore size distribution is about 400 nm in the macropore range, which is substantially due to voids that have been exposed due to the removal of template material.

The pore volume designates the free volume, which is occupied by voids, within the material. The pore volume is measured with a porosimeter, wherein a non-wetting liquid (mercury) is pressed under the action of an external pressure into the pores of a porous material against the counteracting surface tension forces. The force needed is inversely proportional to the pore size and, apart from the total pore volume, it is therefore also possible to determine the pore size distribution of the sample. Mercury porosimetry only detects pore sizes above 2 nm (mesopores and macropores), not "micropores" with pore sizes of less than 2 nm.

The carbon product obtained thereby is relatively filigree and fragile. It is very well suited for use, for instance, as an electrode material for electrochemical cells in batteries and secondary batteries. Since the template material which is not involved in the electrochemical process is removed, it does not contribute to the weight of the cell. For applications where an increased mechanical stability is desired, template material can be maintained in part or completely.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a porous carbon product, comprising the following method steps:
    (a) providing a template material in a form of template particles containing macropores,
    (b) providing a carbon precursor substance,
    (c) infiltrating the macropores of the template with the precursor substance in melted or dissolved form at a temperature Ta,
    (d) carbonizing the precursor substance at a temperature Tc, and
    (e) removing the template to form the porous carbon product, further comprising after step (c) and prior to step (d) subjecting the precursor substance within the macropores of the template to a treatment at a foam formation temperature Tb, wherein at temperature Tb the precursor substance foams during polycondensation and fills the macropores as a fine-pored foam, and wherein after step (d) the fine-pored foam forms a porous carbon structure in which at least 70% of the pores have pore sizes in a range of 10 nm to 150 nm.

2. The method according to claim 1, wherein the foam formation temperature Tb has a temperature range of not more than 100° C., and wherein the treatment duration is at least 10 minutes at the foam formation temperature Tb.

3. The method according to claim 1, wherein during the foam formation treatment the precursor substance separates at least 30% of its initial mass as gas prior to the polycondensation.

4. The method according to claim 1, wherein a carbohydrate is used as the carbon precursor substance.

5. The method according to claim 1, wherein the template particles have a non-spherical morphology and are formed as platelets or small rods with a structural ratio of at least 5 and a mean thickness in a range of 5 μm to 100 μm.

6. The method according to claim 1, wherein the precursor substance is provided in a form of precursor substance particles of a material having a melting temperature below Ta, and wherein the precursor substance particles are mixed with the template particles in a mass ratio in a range between 0.05 and 1.6.

7. The method according to claim 1, wherein the template material is $SiO_2$.

8. The method according to claim 1, wherein step (a) comprises a soot deposition process comprising converting a feedstock material by hydrolysis or pyrolysis into template material particles and depositing the particles on a deposition surface to form a soot body from the template material, wherein the soot body is comminuted into the template particles.

* * * * *